(12) United States Patent
Lin

(10) Patent No.: US 10,261,554 B1
(45) Date of Patent: Apr. 16, 2019

(54) DRAWER FOR RECEIVING STORAGE MODULE

(71) Applicant: Super Micro Computer Inc., San Jose, CA (US)

(72) Inventor: Te-Chang Lin, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 15/933,195

(22) Filed: Mar. 22, 2018

(51) Int. Cl.
G06F 1/18 (2006.01)
G11B 33/12 (2006.01)
A47B 88/95 (2017.01)
G06F 1/16 (2006.01)

(52) U.S. Cl.
CPC .............. *G06F 1/187* (2013.01); *A47B 88/95* (2017.01); *G06F 1/181* (2013.01); *G11B 33/127* (2013.01); *A47B 2088/951* (2017.01); *A47B 2088/954* (2017.01); *G06F 1/1658* (2013.01)

(58) Field of Classification Search
CPC ... G11B 33/127; G11B 33/124; G11B 33/125; G11B 33/00; A47B 88/95; A47B 2088/954; A47B 2088/951; A47B 2200/073; G06F 1/181; G06F 1/1658; G06F 1/187; G06F 1/1656
USPC ............................ 361/679.33, 679.37–679.39
See application file for complete search history.

(56) References Cited

U.S. PATENT DOCUMENTS

| 6,356,441 | B1* | 3/2002 | Claprood | ................ | G06F 1/184 312/332.1 |
| 6,992,900 | B1* | 1/2006 | Suzue | ................ | H05K 7/1409 361/726 |
| 8,154,863 | B2* | 4/2012 | Yang | ................ | G11B 33/124 361/679.37 |
| 2007/0211422 | A1* | 9/2007 | Liu | ................ | G06F 1/187 361/679.37 |

* cited by examiner

*Primary Examiner* — Zachary Pape
(74) *Attorney, Agent, or Firm* — Chun-Ming Shih; HDLS IPR Services (57) ABSTRACT

A drawer for receiving storage module is provided. The storage module drawer includes a case and a manual operating assembly. The manual operating assembly includes a fastener fixed to the case and includes an operating handle rotatably and pivotally connected to the fastener. The fastener includes two arms and a fastening hole penetrating the fastener. The operating handle includes an elastic engagement element fastened by the two arms. The elastic engagement element includes an extending bar and two claws connected to the extending bar. When the elastic engagement element is inserted through the fastening hole to cause the two arms to clamp the two claws, the case is prevented from being detached from a computer chassis where the drawer is mounted inside, so that the storage module drawer can be easily removed or fastened by using the manual operating assembly and has a long lifespan.

18 Claims, 7 Drawing Sheets

DRAWER FOR RECEIVING STORAGE MODULE

TECHNICAL FIELD

The present invention relates to a drawer and, in particular, to a drawer for receiving a storage module. The drawer is mounted inside a rail-type server housing.

BACKGROUND

At present, a solid state drive (SSD) is fixed in a drawer, and then the drawer is mounted inside a server housing. However, the drawer needs to be fastened to the server housing by means of a lot of screws. The assembly is time-consuming and labor-intensive, and a lot of screws are required, thus raising production costs. Besides, when there are many hard disk drives, or the hard disk drive has to be replaced frequently, it is very troublesome to fasten or unfasten the screws.

In view of this, the inventor studied various technologies and created an effective solution in the present disclosure.

SUMMARY

It is an objective of the present invention to provide a drawer for receiving a storage module.

The drawer allows easy fastening and detaching operations and has a long lifespan.

It is another objective of the present invention to provide a drawer for receiving a storage module. The drawer has a simple structure which can be easily produced at low costs.

Accordingly, the present invention provides a drawer for receiving a storage module. The drawer includes a case and a manual operating assembly. An accommodating space is disposed inside the case for holding the storage module therein. The manual operating assembly includes a fastener fixed at one end of the case and includes an operating handle rotatably and pivotally connected to the fastener. The fastener includes two arms arranged corresponding to each other in a spaced-apart relationship and includes a fastening hole penetrating the fastener. The operating handle includes an elastic engagement element engaged between the two arms. The elastic engagement element includes an extending bar and two claws connected to the extending bar. When the elastic engagement element of the operating handle is inserted through the fastening hole of the fastener to cause the two arms to clamp the two claws, the elastic engagement element is deformed and fastened to the fastener to prevent the case from being detached from a computer chassis where the drawer is mounted.

In one embodiment, a gap is formed between the two claws of the elastic engagement element. Each of the two claws includes on its outer surface a depression corresponding to a respective corresponding one of the two arms, and each arm has a protruding portion corresponding to a respective corresponding one of the depressions, so that the two protruding portions are positioned in the two depressions respectively to improve a clamping effect. The fastening hole is preferably a conical hole. The fastening hole has a first diameter and a second diameter opposite to the first diameter, the first diameter is larger than the second diameter, and the first diameter is arranged farther from the case than the second diameter.

A distance from one claw to the other claw is smaller than the first diameter but larger than the second diameter due to the protruding portion, and consequently, the two claws can be easily inserted into the fastening hole via the first diameter and then engaged in the second diameter. In detail, when the two claws are inserted into between the two arms, the two claws are deformed to move inwardly of the gap, and the two arms are also deformed appropriately to bend outwardly. This configuration prevents the two arms or the two claws from being worn out due to frequent use, thus prolonging a product lifespan.

When to detach the two claws from the two arms, the two claws moves inwardly of the gap, and the two arms stretch outwardly from the fastening hole until the two claws are released from the two arms. When the two claws are deformed to be released from the two arms, the operating handle rotates with respect to the fastener until the hook of the operating handle is removed from the retaining portion of the rail-type server housing. At this point, a user can hold the operating handle to pull out the whole case away from the rail-type server housing, so the drawer is removed.

Accordingly, the user only needs to use one hand to fasten or remove the drawer. The fastening effect is excellent, and the drawer also allows quick, simple and easy operations. The drawer has a simple structure which can be easily produced at low costs and also has a long lifespan.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present invention are illustrated below in conjunction with the accompanying drawings. However, it is to be understood that the descriptions and the accompanying drawings disclosed herein are merely illustrative and exemplary and not intended to limit the scope of the present invention.

Referring to FIGS. 1 to 4, the present invention provides a drawer 1 for receiving at least one storage module 3. The drawer 1 is mounted inside a computer chassis (not illustrated) where the drawer is mounted. The computer chassis includes, but is not limited to, a computer workstation, a desktop, a laptop, a server, a rackserver, or a rail-type server housing, for receiving, for example, redundant arrays of independent disks (RAID), network equipment, or etc. In one example embodiment, the storage module 3 is a solid state disk/solid state drive (SSD). However, in alternative embodiments, the storage module 3 can be a hard disk drive (HDD) or a solid state hybrid drive (SSHD). Moreover, in other different embodiment, the computer chassis may be replaced by a non-computer host apparatus such as a USB-connected device, an IT device, or other suitable electronic device.

Figure 1:
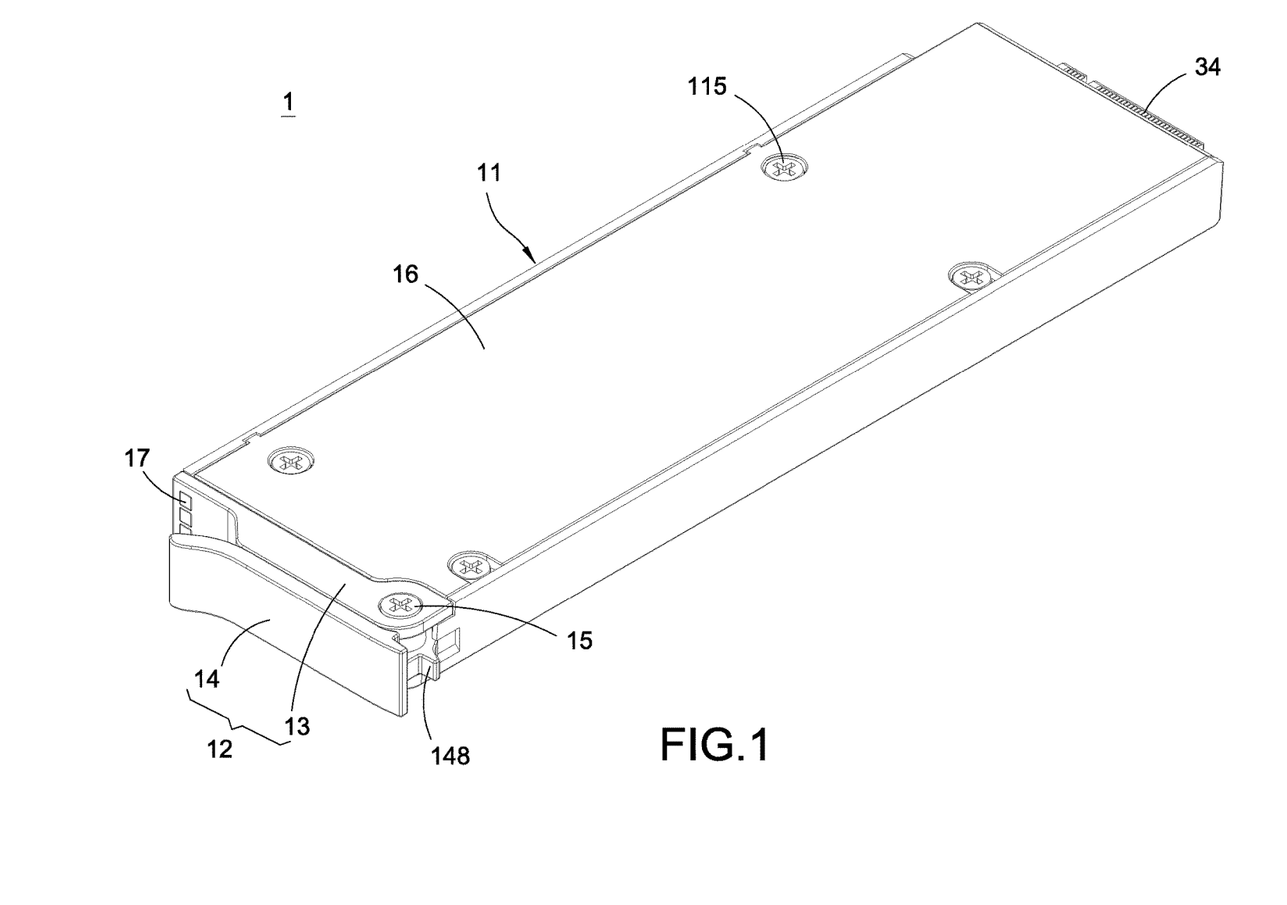
FIG. 1 is a perspective view illustrating a drawer for receiving a storage module according to the present invention.
Figure 2:
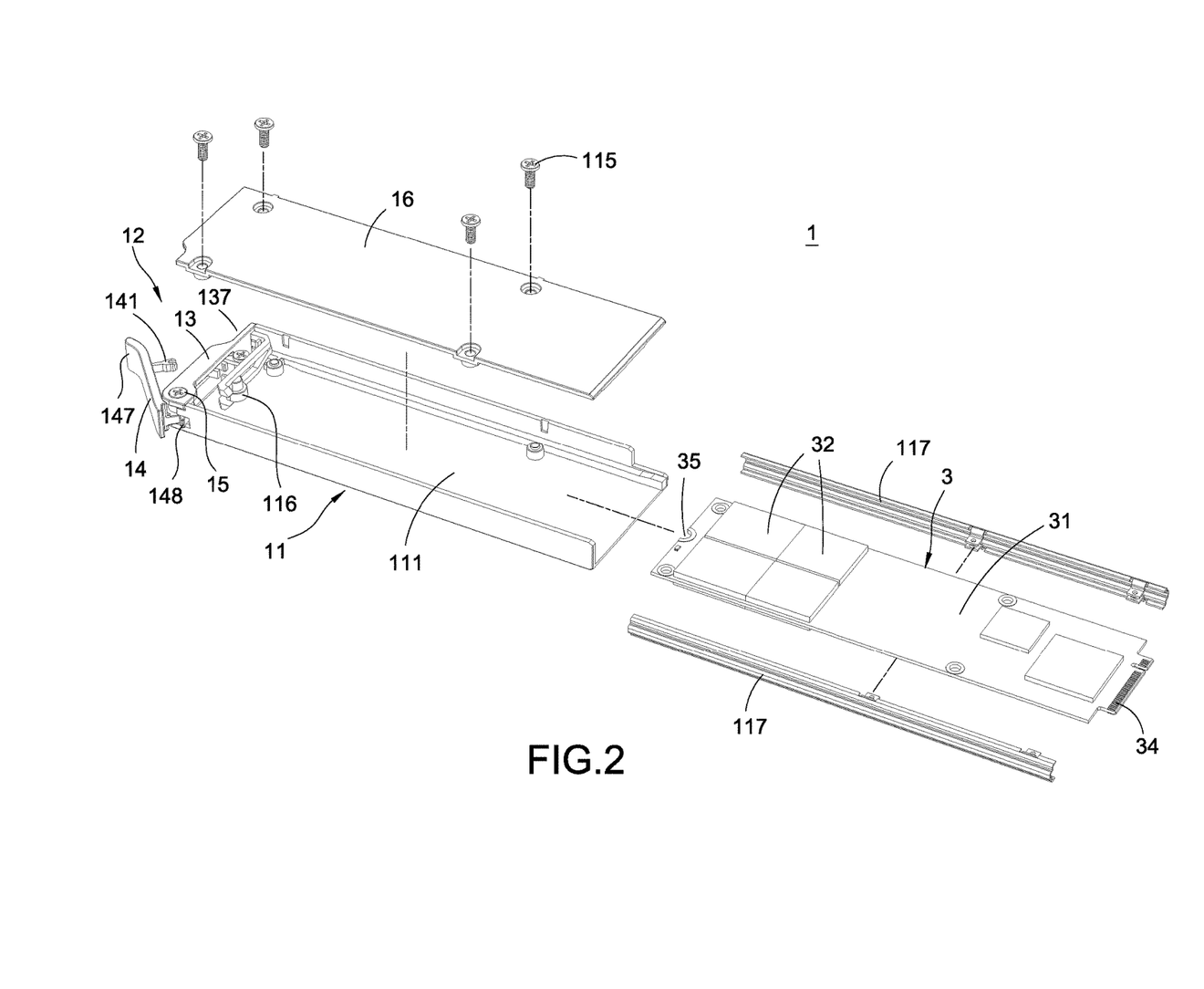
FIG. 2 is an exploded view illustrating the drawer for receiving the storage module.
Figure 3:
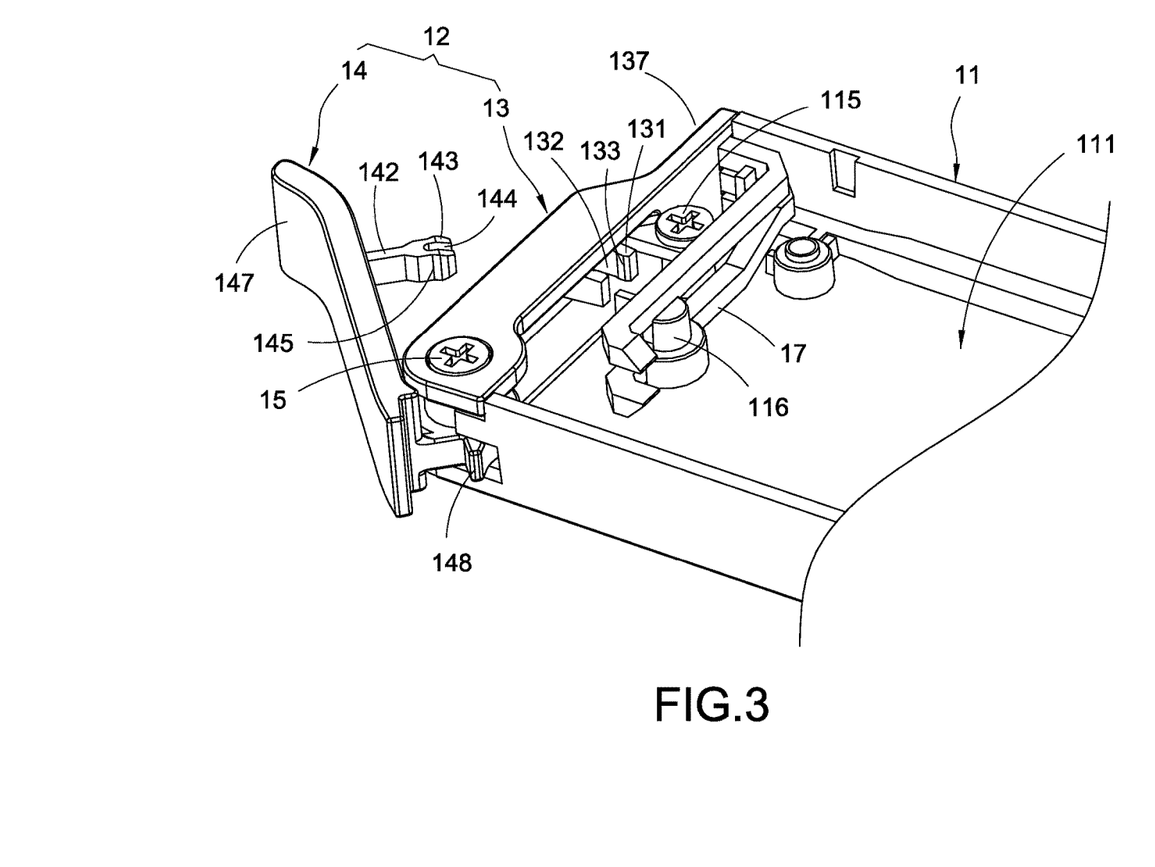
FIG. 3 is a perspective partial view illustrating the drawer for receiving the storage module.

In the embodiment shown in FIG. 2, the storage module 3 includes a circuit board 31 and a plurality of NAND flash memory cards 32 electrically coupled to the circuit board 31. A connection interface 34 is disposed at one end of the circuit board 31, a blocking recess 35 is disposed at the other end of the circuit board 31. The connection interface 34 can be a SATA interface, an M.2 interface, an M.3 interface, or etc.

The drawer 1 includes a case 11 and a manual operating assembly 12. An accommodating space 111 is disposed inside the case 11 for holding the storage module 3 therein. In the embodiment shown in FIGS. 1 and 2, the drawer 1 further includes a cover plate 16 which covers the storage module 3 and is assembled to the case 11, and the drawer 1 also includes a plurality of threaded fastening elements 115 which threadedly fasten the cover plate 16, the storage module 3 and the case 11. The threaded fastening element 115 is, for example, a screw, a bolt, or other suitable element. Furthermore, the drawer 1 of the present embodiment further includes two brackets which hold the storage module 3 at two longitudinal sides thereof, the circuit board 31 of the storage module 3 is clamped by each bracket 117 and is installed together with the two brackets 117 in the accommodating space 111.

Figure 4:
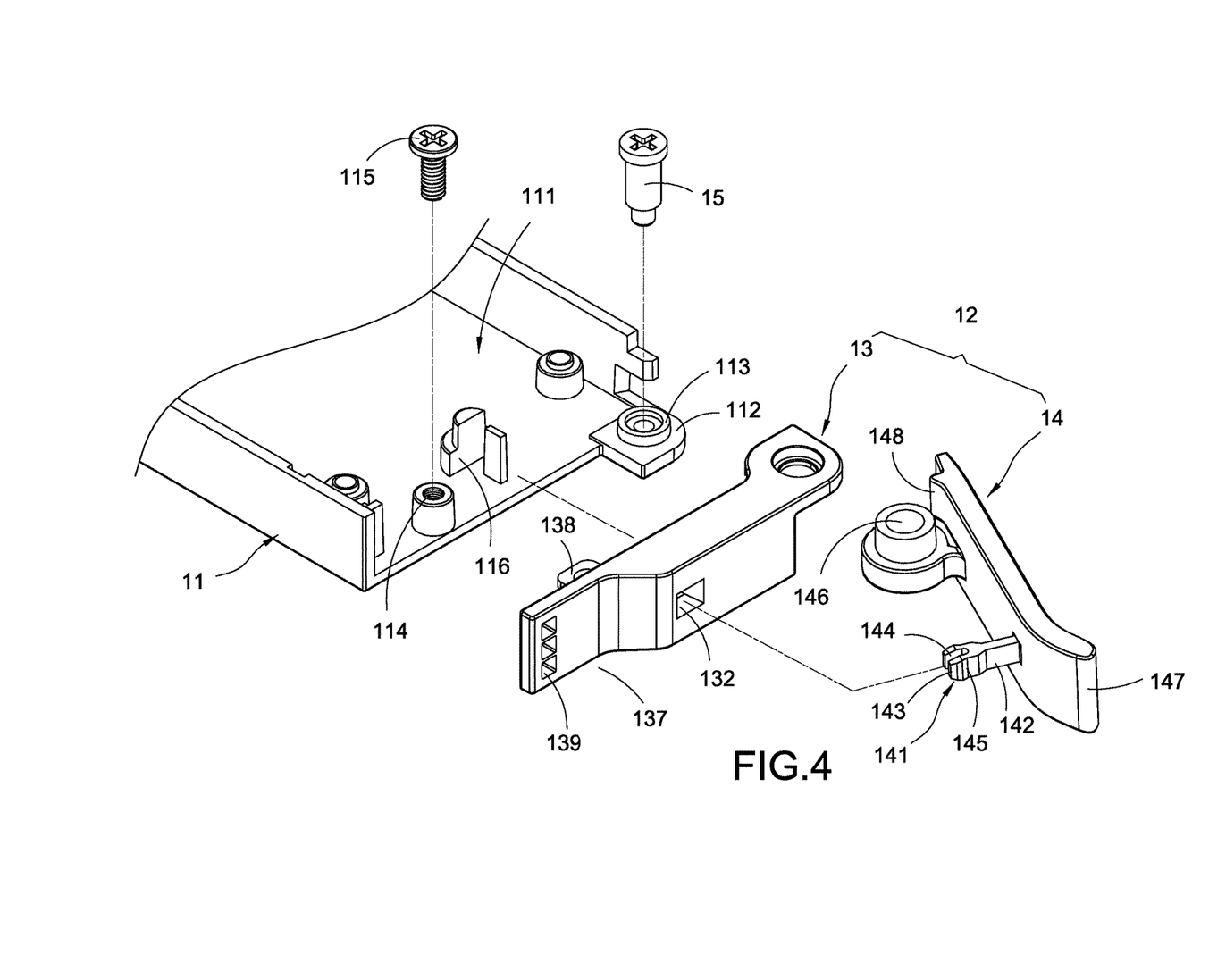
FIG. 4 is an exploded view of FIG. 3.
Figure 5:
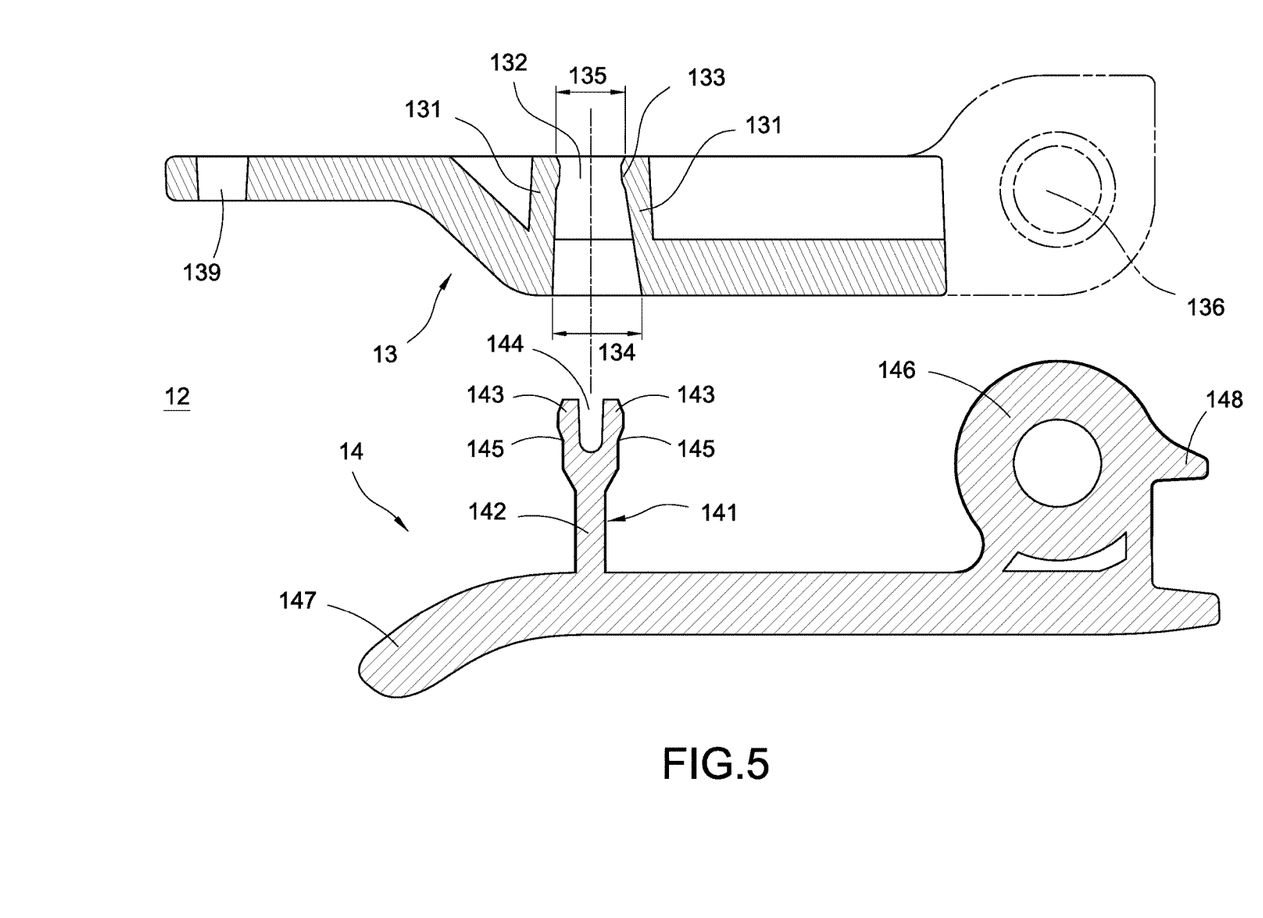
FIG. 5 is a cross-sectional view illustrating a manual operating assembly of the drawer.

Referring to FIG. 5, the manual operating assembly 12 includes a fastener 13 fixed at one end of the case 11 and an operating handle 14 rotatably and pivotally connected to the fastener 13. Referring to FIG. 4, the case 11 includes a protruding base 112 and a hollow pillar 113 on the protruding base 112, an pivot hole 136 disposed corresponding to the hollow pillar 113 and a recessed portion 137 are disposed at two ends of the fastener 13 respectively, the operating handle 14 includes a tilted portion 147 tilted away from the recessed portion 137 and includes a pivot 146 pivotally connected to the pivot hole 136 and positioned in the hollow pillar 113. In the embodiment shown in FIGS. 3 and 4, the drawer 1 further includes a securing element 15 inserted through both the pivot hole 136 and the pivot 146. The securing element 15 is, for example, a screw or a bolt. There is a gap space between the tilted portion 147 and the recessed portion 137, and the gap space facilitates a user's manipulating the tilted portion 147 with one hand to move the operating handle 14 to thereby remove the drawer 1 or secure the drawer 1 to the computer chassis 2.

In order to improve the fastening effect of the fastener 13, the case 11 includes a fixing pillar 114 and a threaded fastening element 115 threadedly fastened to the fixing pillar 114. The threaded fastening element 115 is, for example, a screw or a bolt. The fastener 13 includes a sleeve 138 positioned on the fixing pillar 114, and the threaded fastening element 115 is fastened to the fixing pillar 114 to prevent the sleeve 138 from being detached from the fixing pillar 114. The case 11 further includes a block pillar 116 adjacent to the fixing pillar 114, the block pillar 116 is abutted against a blocking recess 35 of the storage module 3, so that the storage module 3 is retained in the case 11.

The fastener 13 includes two arms 131 arranged corresponding to each other in a spaced-apart relationship and includes a fastening hole 132 penetrating the fastener 131. The two arms 131 protrude towards the case 11 by a length, so that a distal end of each arm 131 is flush with one side of the fastener 13.

The operating handle 14 includes an elastic engagement element 141 engaged between the two arms 131, and the elastic engagement element 141 includes an extending bar 142 and two claws 143 connected to the extending bar 142. A gap 144 is formed between the two claws 143.

Figure 6:
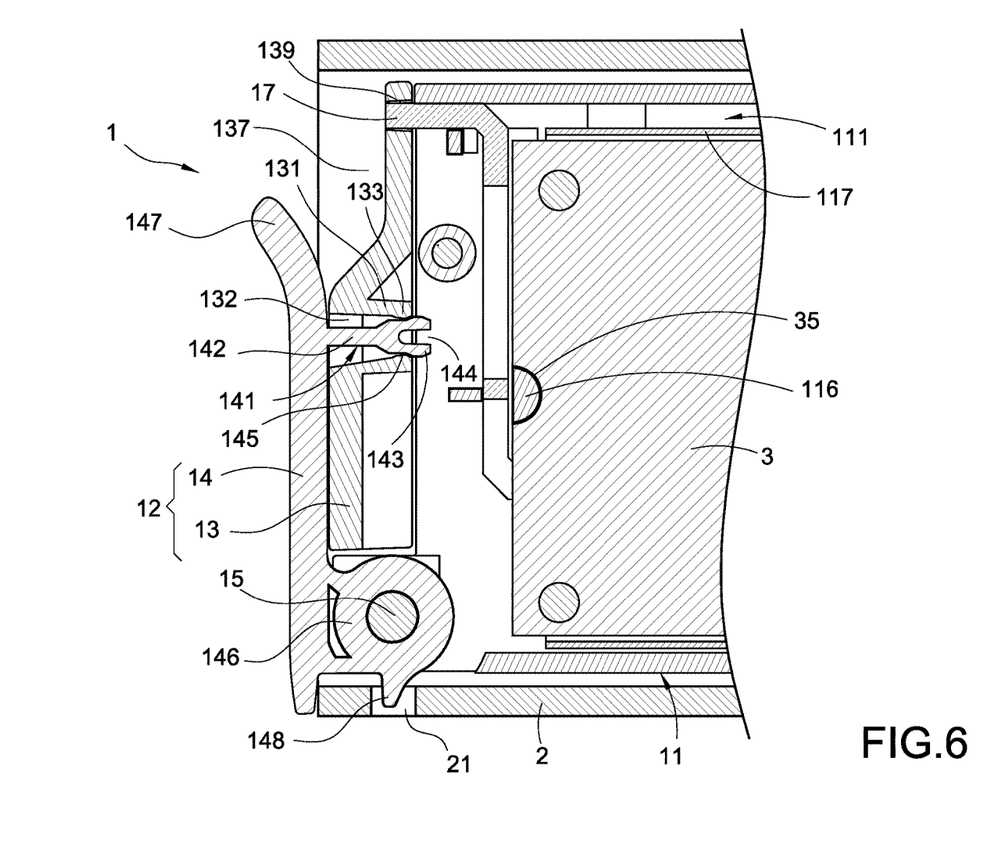
FIG. 6 is a cross-sectional view illustrating that the drawer for receiving the storage module is secured.

Please refer to FIG. 6 for a cross-sectional view illustrating that the drawer for receiving the storage module is secured according to the present embodiment. When the elastic engagement element 141 of the operating handle 14 is inserted through the fastening hole 132 of the fastener 13, and the two arms 131 clamp the two claws 143, the two claws 143 of the elastic engagement element 141 are deformed and engaged with the fastener 13 to prevent the case 11 from being detached from the computer chassis 2. Therefore, the drawer 1 is secured inside the computer chassis 2. In the embodiment shown in FIGS. 5 and 6, each of the two claws 143 includes on its outer surface a depression 145 corresponding to a corresponding one of the two arms 131, each arm 131 has a protruding portion 133 corresponding to a respective corresponding one of the depressions 145, so that the two protruding portions 133 are positioned in the two depressions 145 respectively to improve a clamping effect.

The fastening hole 132 of the fastener 13 is preferably a conical hole. The fastening hole 132 has a first diameter 134 and a second diameter 135 opposite to the first diameter 134, the first diameter 134 is larger than the second diameter 135, and the first diameter 134 is arranged farther from the case 11 than the second diameter 135. In particular, a distance from one claw 143 to the other claw 143 is smaller than the first diameter 134 but larger than the second diameter 135 due to the protruding portion 133, and consequently, the two claws 143 can be easily inserted into the fastening hole 132 via the first diameter 134 and then engaged in the second diameter 135. In detail, when the two claws 143 are inserted into between the two arms 131, the two claws 143 are deformed to move inwardly of the gap 144, and the two arms 131 are also deformed appropriately to bend outwardly. This configuration prevents the two arms 131 or the two claws 143 from being worn out due to frequent use, thus prolonging a product lifespan. When the two claws 143 are clamped by the two arms 131, the two claws 143 protrude out of the two arms 131.

Each claw 143 is chamfered on its end and the depression 145, and each protruding portion 133 is also chamfered, so as to reduce abrasion resulting from usage.

As shown in FIG. 6, a hook 148 is disposed at one end of the operating handle 14, the computer chassis 2 includes a retaining portion 21, such as an opening, arranged corresponding to the hook 148, and the hook 148 is engaged with the retaining portion 21 of the computer chassis 2 to prevent the drawer 1 from being accidentally detached/removed from the computer chassis 2. In other words, the hook 148 of the operating handle 14 can protect the drawer 1 from being removed/removed from the computer chassis 2, thus enhancing safety and reliability in use.

Figure 7:
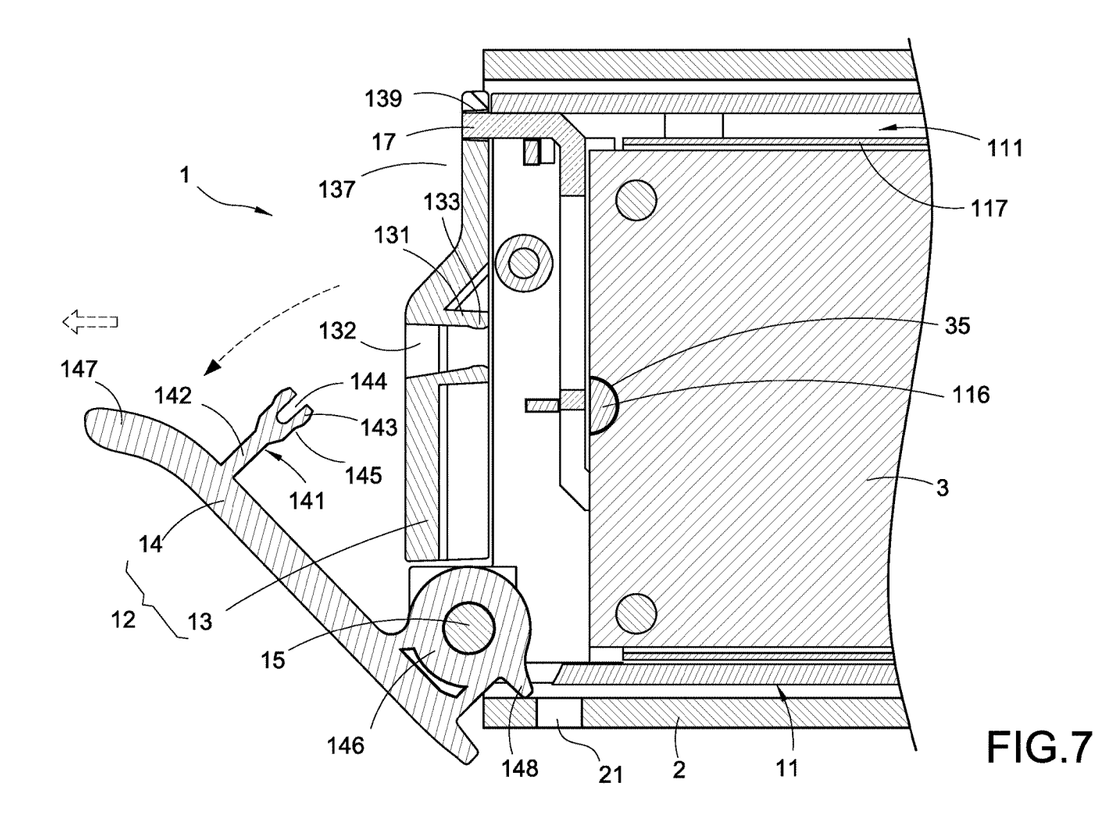
FIG. 7 is a cross-sectional view illustrating that the drawer for receiving the storage module is to be removed.

Please refer to FIG. 7 for a cross-sectional view illustrating that the drawer for receiving the storage module is released. When to remove the drawer 1 from the computer chassis 2, a tilted portion 147 of the operating handle 14 or other suitable place is operated by one hand to pull out the elastic engagement element 141 from the fastening hole 132 of the fastener 13. The two claws 143 move inwardly of the gap 144, and the two arms 131 stretch outwardly from the fastening hole 132, so as to release the two claws 143 from the two arms 131. When the two claws 143 are deformed to be released from the two arms 131, the operating handle 14 rotates with respect to the fastener 13 until the hook 148 of the operating handle 14 is removed from the retaining portion 21 of the computer chassis 2. At this point, a user can hold the operating handle 14 to pull out the whole case 11 away from the computer chassis 2, so the drawer 1 is removed.

It should be noted that, the drawer 1 further includes at least one light bar 17 electrically connected to the storage module 3, the fastener 13 includes at least one viewing hole 139 arranged corresponding to the light bar 17, and one end of the light bar 17 is inserted in the viewing hole 139. The light bar 17 and the storage module 3 are conventional techniques, so a detailed description thereof is omitted for brevity.

Accordingly, the user only needs to use one hand to fasten or remove the drawer 1. The fastening effect is excellent, and the drawer 1 also allows quick, simple and easy operations. The manual operating assembly 12 is made of, for example, plastic; however, the present invention is not limited in this regard. The present invention has a simple structure which can be easily produced at low costs and also has a long lifespan.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A drawer for receiving a storage module, comprising:
a case, an accommodating space being disposed inside the case for holding the storage module therein; and
a manual operating assembly, the manual operating assembly including a fastener fixed at one end of the case and including an operating handle rotatably and pivotally connected to the fastener, the fastener including two arms arranged corresponding to each other in a spaced-apart relationship and including a fastening hole penetrating the fastener, the operating handle including an elastic engagement element engaged between the two arms, the elastic engagement element including an extending bar and two claws connected to the extending bar, wherein when the elastic engagement element of the operating handle is inserted through the fastening hole of the fastener to cause the two arms to clamp the two claws, the elastic engagement element is deformed and fastened to the fastener to prevent the case from being removed from a computer chassis where the drawer is mounted inside.

2. The drawer for receiving a storage module according to claim 1, wherein a gap is formed between the two claws of the elastic engagement element.

3. The drawer for receiving the storage module according to claim 2, wherein when the two claws are to be released from the two arms, the two claws move inwardly of the gap, and the two arms stretch outwardly of the fastening hole to release the two claws.

4. The drawer for receiving the storage module according to claim 1, wherein each of the two claws includes on its outer surface a depression corresponding to a respective corresponding one of the two arms, and each arm includes a protruding portion corresponding to a respective corresponding one of the two depressions, so that the two protruding portions are positioned in the two depressions respectively.

5. The drawer for receiving the storage module according to claim 4, wherein each claw is chamfered on its end and the depression, and each protruding portion is also chamfered.

6. The drawer for receiving the storage module according to claim 1, wherein the fastening hole is a conical hole, the fastening hole has a first diameter and a second diameter opposite to the first diameter, the first diameter is larger than the second diameter, and the first diameter is arranged farther from the case than the second diameter.

7. The drawer for receiving the storage module according to claim 1, wherein when the two claws are clamped and fixed by the two arms, the two claws protrude out of the two arms.

8. The drawer for receiving the storage module according to claim 1, wherein the case includes a protruding base and a hollow pillar on the protruding base, a pivot hole disposed corresponding to the hollow pillar and a recessed portion are disposed at two ends of the fastener respectively, and the operating handle includes a tilted portion titled away from the recessed portion and includes a pivot pivotally connected to the pivot hole and positioned in the hollow pillar.

9. The drawer for receiving the storage module according to claim 8, further comprising a securing element inserted through both the pivot hole and the pivot.

10. The drawer for receiving the storage module according to claim 1, wherein a hook is disposed at one end of the operating handle, the computer chassis includes a retaining portion arranged corresponding to the hook, and the hook is engaged with the retaining portion of the computer chassis.

11. The drawer for receiving the storage module according to claim 1, wherein the case includes a fixing pillar and a threaded fastening element threadedly fastened to the fixing pillar, the fastener includes a sleeve positioned on the fixing pillar, and the threaded fastening element prevents the sleeve from being detached from the fixing pillar.

12. The drawer for receiving the storage module according to claim 11, wherein the case further includes a block pillar adjacent to the fixing pillar, the block pillar is abutted against a blocking recess of the storage module, so that the storage module is retained in the case.

13. The drawer for receiving the storage module according to claim 1, further comprising a cover plate which covers the storage module and is assembled to the case and comprising a plurality of threaded fastening elements which fasten the cover plate, the storage module and the case.

14. The drawer for receiving the storage module according to claim 1, further comprising two brackets which hold the storage module at two longitudinal sides thereof, the storage module being clamped by each bracket and being installed together with the two brackets in the accommodating space.

15. The drawer for receiving the storage module according to claim 1, further comprising at least one light bar electrically connected to the storage module, the fastener including at least one viewing hole arranged corresponding to the light bar, one end of the light bar being inserted in the viewing hole.

16. The drawer for receiving the storage module according to claim 1, wherein the computer chassis is a rail-type server housing.

17. The drawer for receiving the storage module according to claim 1, wherein the computer chassis is replaced by a non-computer host apparatus.

18. The drawer for receiving the storage module according to claim 17, wherein the non-computer host apparatus is a USB-connected device.

* * * * *